United States Patent
Zodik et al.

(10) Patent No.: US 6,785,683 B1
(45) Date of Patent: Aug. 31, 2004

(54) CATEGORIZATION AND PRESENTATION TOOL FOR CODE RESOURCES

(75) Inventors: Gabi Zodik, Nesher (IL); Vita Bortnikov, Haifa (IL); Avi Yaeli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 09/611,060

(22) Filed: Jul. 6, 2000

(51) Int. Cl.[7] .............................................. G06F 17/60
(52) U.S. Cl. ........................................ 707/101; 707/102
(58) Field of Search ................................ 707/2, 3, 102, 707/100, 104, 10, 101; 706/45, 10; 704/4; 717/2

(56) References Cited

U.S. PATENT DOCUMENTS

| | | | | |
|---|---|---|---|---|
| 5,371,807 A | * | 12/1994 | Register et al. | 382/159 |
| 5,675,805 A | * | 10/1997 | Boldo et al. | 717/114 |
| 5,794,050 A | * | 8/1998 | Dahlgren et al. | 717/144 |
| 5,857,212 A | * | 1/1999 | Van De Vanter | 707/10 |
| 5,970,490 A | * | 10/1999 | Morgenstern | 707/10 |
| 6,192,360 B1 | * | 2/2001 | Dumais et al. | 707/6 |
| 6,237,136 B1 | * | 5/2001 | Sadahiro | 704/4 |
| 6,330,530 B1 | * | 12/2001 | Horiguchi et al. | 704/4 |
| 6,519,580 B1 | * | 2/2003 | Johnson et al. | 706/47 |
| RE38,104 E | * | 4/2003 | Gosling | 717/140 |

* cited by examiner

*Primary Examiner*—Charles Rones
(74) *Attorney, Agent, or Firm*—Darby & Darby (57) ABSTRACT

A technique for rapid retrieval and navigation of assets stored on a computer system involves defining a taxonomy and classification rules according to asset-specific criteria, identifying the stored assets, automatically categorizing the identified assets according to the defined classification system, followed by indexing of the categorized assets. A presentation tool is utilized to display and navigate the indexed assets in a first pane, using a tree view having two integrated hierarchies of classified information. The hierarchies can be specific to a programming language or other code assets. All categories of indexed information in which a said selected element is classified is displayed in a second pane.

58 Claims, 5 Drawing Sheets

CATEGORIZATION AND PRESENTATION TOOL FOR CODE RESOURCES

BACKGROUND OF THE INVENTION

1. Field of the Invention.

This invention relates to computer system resource management systems and methods in general, and more specifically, to methods for indexing and locating assets, such as application programs which may be written in a variety of different programming languages, in a distributed or network environment.

2. Description of the Related Art.

One of the most common uses of computers is to create, store, and index data for later retrieval. As a result of the burgeoning growth of computer usage, the number of data files available for searching has grown exponentially, leading to an information overload that can overwhelm a data searcher.

To help manage the access to these massive numbers of files, also known as "assets", a process called "data mining" has evolved. Data mining is defined in Newton's Telecom Dictionary (15th Edition, Miller Freeman Publishing, New York, N.Y.) as "[U] sing sophisticated data search capabilities that use statistical algorithms to discover patterns and correlations in data." In essence, computers are used to "crawl" through masses of data files, analyze the information contained in the files according to criteria input by the user, and output results to the user which the user can use to study the information further.

To support the explosive growth of computer usage, software development has become a key part of any company engaged in high-technology business. Large companies may have many software development groups located at numerous locations throughout the world, with each group employing hundreds or thousands of employees.

As used herein, complete programs (e.g., Microsoft Word™) developed by the programmers are referred to as "software assets" and the various subroutines used to produce the software asset (e.g., C++ subroutines and programs used to create Microsoft Word™) are referred to as "code assets." These assets may number in the thousands or more for a single company and vary substantially in complexity, function, and size. For example, an asset may be a single program comprising hundreds of thousands of lines of computer code and designed to perform a multitude of tasks; at the other end of the spectrum, an asset may be a single subroutine comprising three lines of code.

With large numbers of employees focusing their work on the development of these assets, management becomes a critical task. With multiple groups within a company at different locations developing software for a variety of tasks, it is inevitable that duplication of effort will occur.

To avoid such duplication, it is desirable for all of the members of design groups, as well as all of the design groups within a company, to be able to share with each other the assets that they develop, and systems have been developed to assist in the management of such assets. In the software development field, the management, indexing, and retrieval of assets introduces an additional level of complexity not necessarily found in other asset management schemes. In particular, within a single group, assets may be developed in several different programming languages (e.g., Java, C/C++, COBOL, HTML, and/or XML) at the same time. Searching for code assets increases the complexity and difficulty of the search, since programmers typically want to search for language-specific constructs/semantics, such as inheritance relation, in object-oriented languages which cannot be captured using standard free-text searches. This makes it difficult for the users of the system to thoroughly search all of the assets.

Accordingly, it would be desirable to have an asset location system which offers the ability for free-text "search engine" style queries, attribute-specific queries, or a mixture of free-text queries and attribute-specific queries.

In our copending application Ser. No. 09/473,554 of common assignee herewith, and hereby incorporated by reference, there is disclosed a method and system for locating assets that provides a capability for the gathering of information about assets contained in data repositories. The technique is adapted to gathering information from either a single data repository or a plurality of data repositories, possibly in disparate locations of an enterprise. The captured information is then consolidated into a single database for access by multiple users. While this technique represents an improvement over conventional techniques of asset retrieval, nevertheless this technique does not provide automatic categorization to facilitate search and navigation by the users. Manual categorization has several drawbacks. When done by repository organizers, it requires the presence of an expert in each resource domain at all times. This is a very expensive solution and because it is not scaleable as in modern systems, the expert can never keep up with new resources which are added/updated to the repository every day. On the other hand, categorization which is done by users is also less than satisfactory, because users dislike the necessary overhead of describing the category for every resource, and moreover, they may be unqualified to categorize their resources.

SUMMARY OF THE INVENTION

It is therefore a primary object of some aspects of the present invention to improve the efficiency of asset location in computer system resource management systems.

It is another object of some aspects of the present invention to categorize code resources automatically using predefined taxonomy in computer system resource management systems.

It is a further object of some aspects of the present invention to enable users of code repositories to navigate through the repository of code resources in a computer system resource management system according to the category taxonomy without having to actually compose any queries.

It is yet another object of some aspects of the present invention to provide an improved tool for presenting categorization results in a computer system resource management system based on the category information and on the language semantics These and other objects of the present invention are attained by a tool that is capable of categorizing code resources automatically into predefined taxonomy trees, that is into a set of predefined categories) . This tool enables the users of code repositories to navigate through the repository according to the category taxonomy without having to actually compose any queries. Moreover the category information can be used as part of the query criteria by the users.

In addition this invention describes a tool for presenting the categorization results in a novel method, based on the category information and on the language semantics.

The invention provides a computer-implemented method for indexing and locating assets stored on a storage device, which is performed by defining asset-specific categories for classification of asset-specific information, identifying stored assets, extracting the set-specific information from the stored assets, classifying the extracted information in the set-specific categories according to a predefined set of rules, and storing the classified textual and semantic information for retrieval.

According to a further aspect of the invention, extracting the set-specific information is performed with a language specific parser.

According to yet another aspect of the invention, the predefined set of rules includes a plurality of predefined sets of rules, wherein each of the predefined sets of rules is applied to a different language specific group.

According to still another aspect of the invention, a syntax of rules in the predefined set of rules is "<condition>→<category>@<weight-factor>".

According to an additional aspect of the invention, the storage device includes a plurality of storage devices linked in a communications network.

According to an aspect of the invention, the method includes automatically updating the steps of identifying, extracting, and classifying when a new resource is stored in the storage device.

The invention provides a computer-implemented method for locating assets stored on a storage device, comprising the steps of identifying stored assets, extracting asset-specific information from the stored assets, classifying the extracted information according to a predefined set of rules, storing the classified textual and semantic information for retrieval, and displaying the stored information in a tree view. The tree view has a first hierarchy of the classified textual and semantic information and a second hierarchy of the classified textual and semantic information, wherein nodes that are represented in the tree view comprise nodes of the first hierarchy and nodes of the second hierarchy.

According to a further aspect of the invention, displaying is achieved by selecting a displayed element in a first display area to define a selected element, and displaying all categories of the stored information in which the selected element is classified.

According to another aspect of the invention, the selected element is classified according to a category relevancy score.

According to an additional aspect of the invention, the first hierarchy includes categories of a computer programming language that were identified in the step of classifying, and the second hierarchy includes a hierarchy of instances of the categories.

According to an aspect of the invention, the second hierarchy includes a class package.

According to still another aspect of the invention, the second hierarchy includes a name space.

According to an aspect of the invention, there is a step of preclassifying information that was obtained in the step of extracting, according to a plurality of language specific groups.

According to another aspect of the invention, the predefined set of rules includes a plurality of sets of rules, wherein each set of rules is applied to a different language specific group.

The invention provides a computer software product, comprising a computer-readable medium in which computer program instructions are stored. The instructions, when read by a computer, cause the computer to perform the steps of identifying stored assets on a storage device associated with the computer, extracting asset-specific information from the stored assets, classifying the extracted information according to a predefined set of rules, and storing the classified information for retrieval, and, on a monitor connected to the computer, in a first display area of the monitor displaying the stored information in a tree view which has a first hierarchy of the classified information and a second hierarchy of the classified information, wherein nodes of the first hierarchy are integrated with nodes of the second hierarchy.

According to another aspect of the invention, the step of displaying also includes selecting a displayed element in the first display area, and in a second display area of the monitor, displaying all categories of the stored information in which a selected element is classified.

According to a further aspect of the invention, the selected element is classified according to a category relevancy score.

The invention provides a computer system, comprising a storage device for storage of assets therein, a display monitor, a memory for storage of program instructions, and an execution unit that accesses the program instructions in the memory for execution thereof, wherein the program instructions cause the computer to perform the steps of identifying stored assets on the storage device, extracting asset-specific information from the stored assets, classifying the extracted information according to a predefined set of rules, storing the classified textual and semantic information for retrieval, and displaying in a first display area of the display monitor the stored information in a tree view has a first hierarchy of the classified textual and semantic information and a second hierarchy of the classified textual and semantic information, wherein nodes of the first hierarchy are integrated with nodes of the second hierarchy.

BRIEF DESCRIPTION OF THE DRAWING

For a better understanding of these and other objects of the present invention, reference is made to the detailed description of the invention, by way of example, which is to be read in conjunction with the following drawing, wherein.

DESCRIPTION OF THE PREFERRED EMBODIMENTS

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Figure 1:
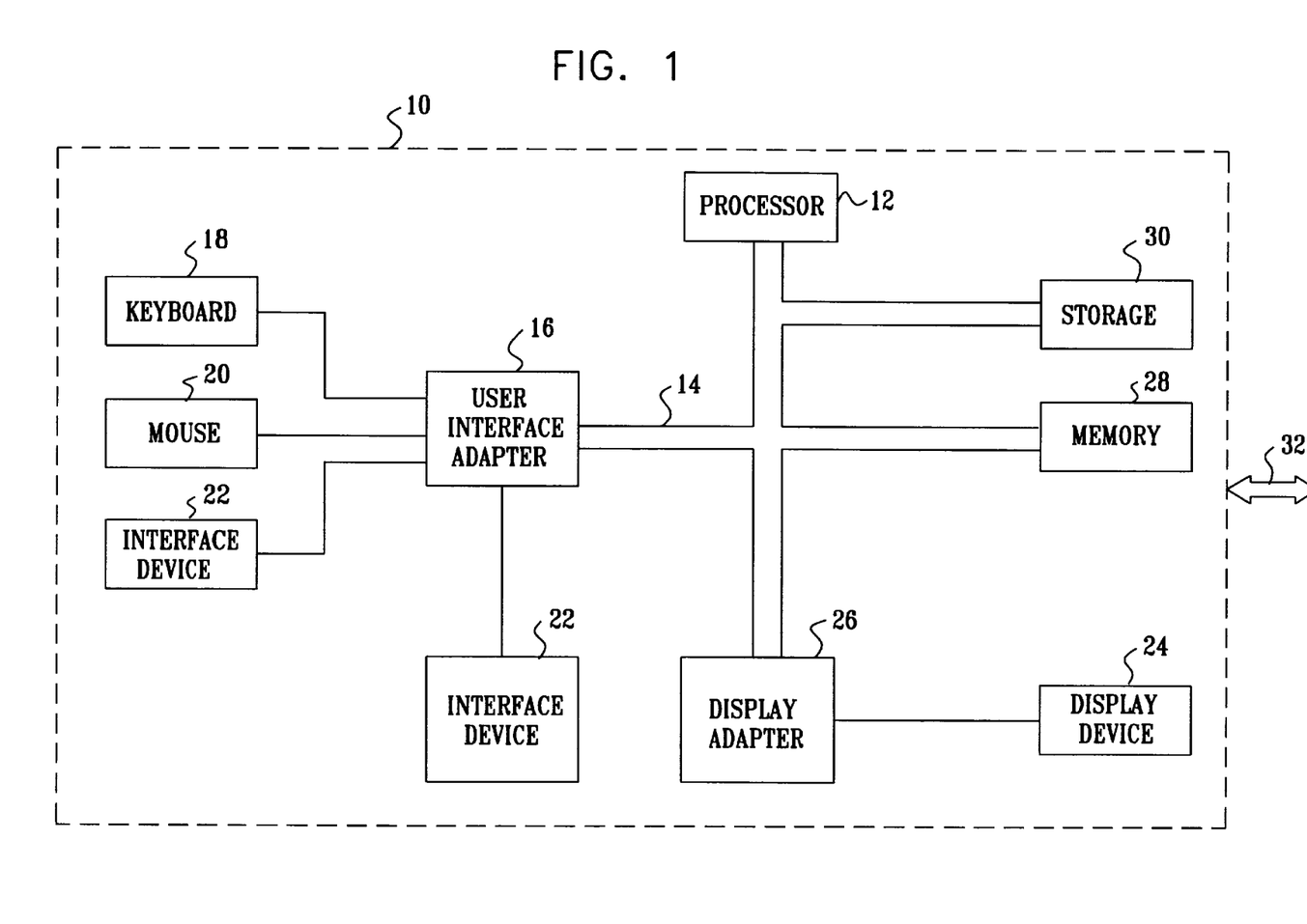
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
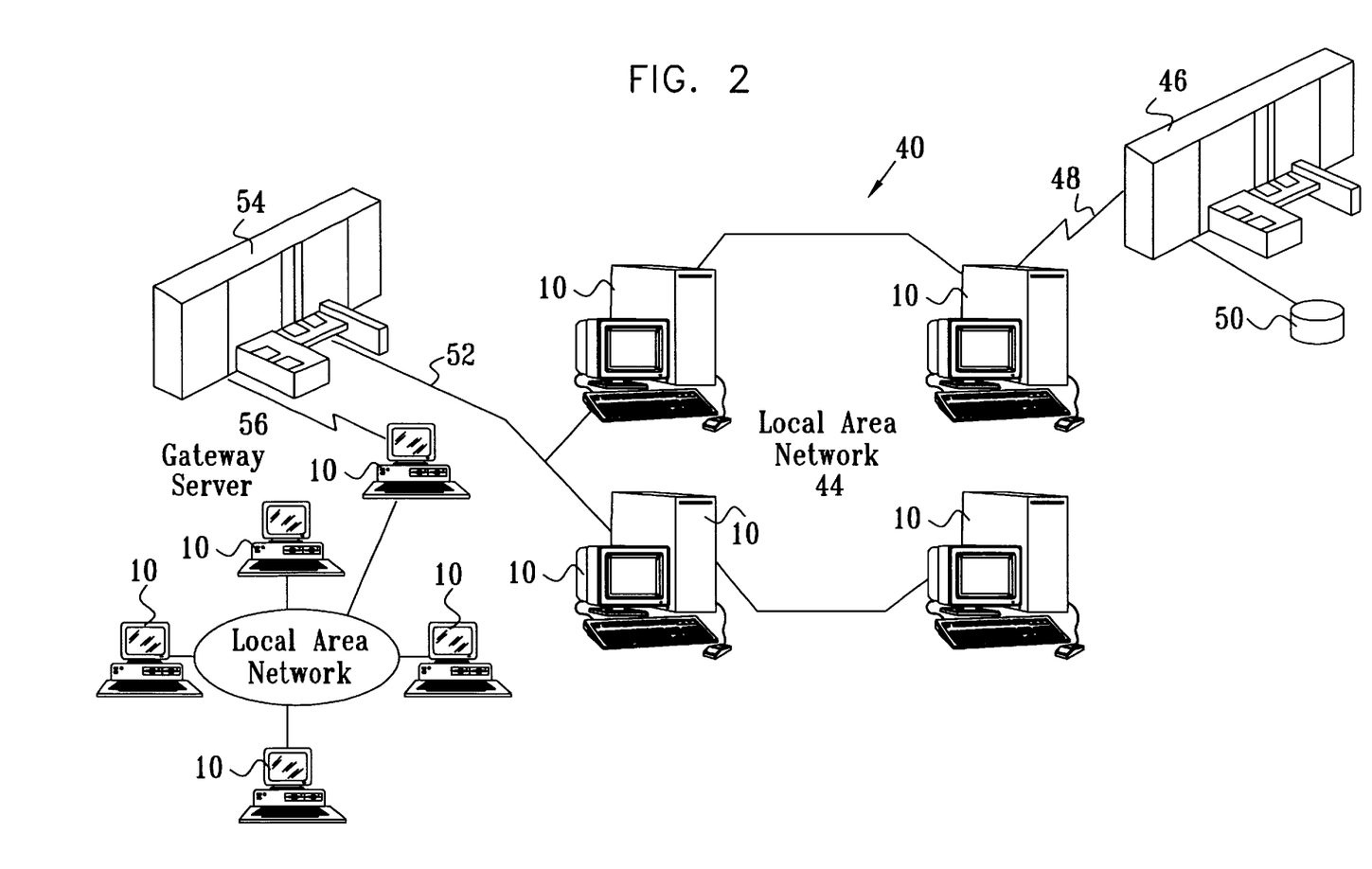
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 3:
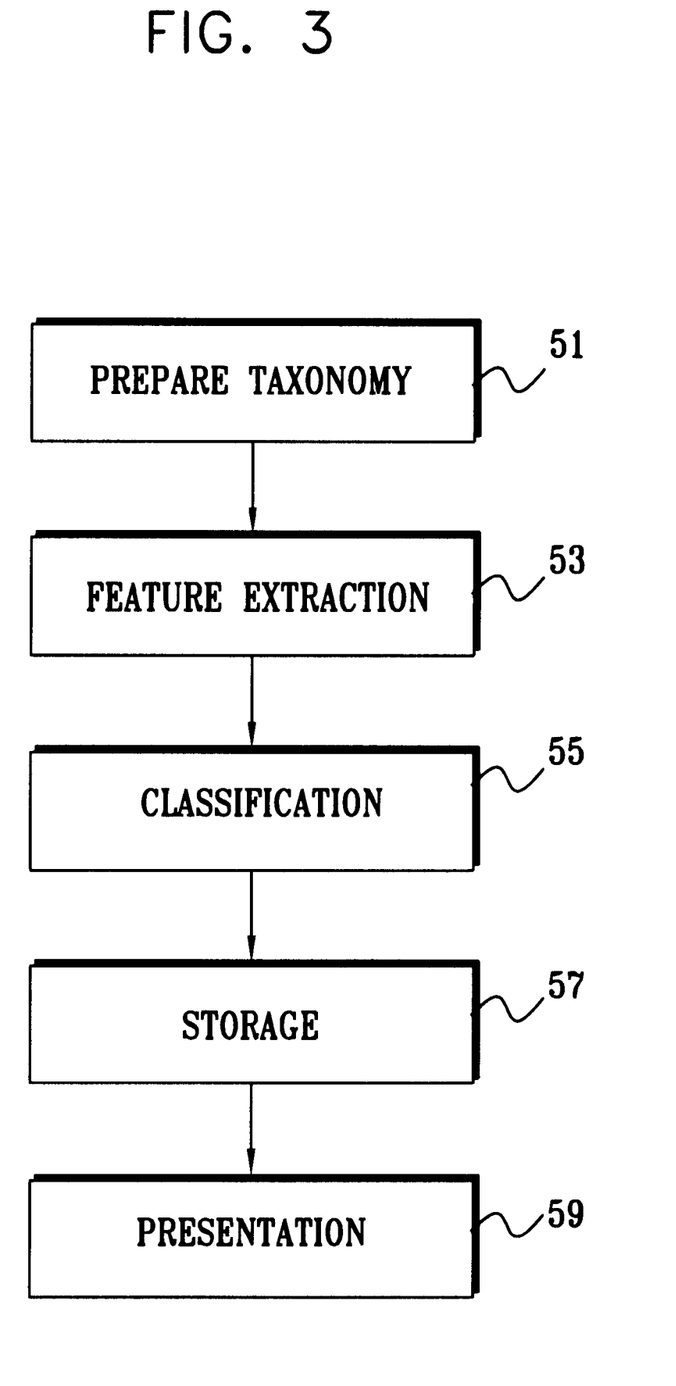
FIG. 3 is a high level flow diagram illustrating the procedure according to some aspects of the invention.

The preferred embodiment of the invention is explained herein in terms of a programming language domain; however the invention is also applicable to other types of knowledge domains. As shown in FIG. 3, in a preliminary phase 51, prior to the process of code resource categorization, a category taxonomy of the code resources is defined by a domain expert, either manually or using artificial intelligence techniques known to the art. This taxonomy is relatively static, and its preparation can be viewed as a non-recurring task. The task of the domain expert comprises several subtasks. Initially he defines a taxonomy. It should be emphasized that this definition is for the particular domain type. Then he sets out the significant features of the domain resource type that are needed in order to properly enable a categorization decision. Lastly he defines a set of categorization rules which apply to the significant features, and which can later be applied to categorize a domain resource type.

The classification process itself is composed of the following three main phases.

In the feature extraction phase 53 all the information from the code resource which is significant for the categorization decision is identified, preferably using the techniques taught in the above noted application Ser. No. 09/473,554, and then extracted. Essentially the feature extraction phase 53 is a technical process performed by a parser, which extracts the significant features identified by the domain expert from the resources. Both textual information and language specific semantic information are extracted. For example in the case of a Java source code resource, methods and fields names are extracted.

In a categorization phase 55 the material extracted in the feature extraction phase 53 used to classify the resources into categories. The classification procedure applies the predefined set of rules which were developed in the preliminary phase 51 in order to classify the code resource. The classification rules are written only once. The classification process is done automatically for each new or updated resource in the repository. A code resource may be classified into more than one category. Since the categories are subject and language oriented, a classification into more than one category means that the code resource is related to more than one subject or has a semantic relation to other resources in the category. The categorization results, which are the names of the categories in which a resource was classified, are then stored in step 56 for later use, preferably according to the teachings of the above noted application Ser. No. 09/473,554. It should be noted that the categorization results are not indexes. While it may be advantageous to index the categorization results for other purposes, this is outside the scope of the present invention and will not be discussed.

In a presentation phase 59 a presentation model is constructed based on the domain taxonomy, the categorization results and based on the semantic information of the resources. The semantic information is used to build a secondary hierarchy as will be disclosed in further detail hereinbelow.

Feature Extraction Phase

The feature extraction phase 53 will now be explained in further detail. This activity makes use of a language specific parser to extract the "interesting" features from each of the resources. The features are arranged into several groups according to the language semantics. For each group a different set of rules is applied during the categorization phase 55 which is disclosed hereinbelow.

For Java resources the following features are extracted: text, class name, parent, parent name, methods, fields, imports, package name, and field types. In general several heuristics are employed for dividing composite names into single words in order to fully exploit all the information available from names in the resource. For example one of these heuristic algorithms searches for capital letters inside identifiers (strings), and each time a capital letter is encountered, the name is divided such that an individual word begins with the encountered capital letter. The original form of the name is stored as well. For example, the class name "ResourceAnalyzer" is divided into the words Resource and Analyzer. This approach has proven to be very useful for those Java resources in particular that make use of this coding convention.

Moreover, the following groups of features relating to Java resources have been identified:

comments—text;
inames—class name, parent name;
names—class name, parent name, methods, fields; and
types—imports, package, field types.

The motivation for the selection of these groups is as follows. The comments group holds all the textual information extracted from the resource and is the equivalent of the textual information extracted from documents, which have been subjected to ordinary text categorization. The next group, inames, is the equivalent of the title of a document. The group inames includes the class and parent names because the inventors have observed that these names have a special importance, and in many cases, the class name expresses the meaning of the entire class. The third group, names, includes all the names that describe the behavior of the class, which is mainly encapsulated in the method and field names. It is considered that classes that have in common several similar method names share some common behavior and should reside in the same category. The fourth group, types, includes all the additional type information implied by the class. The group types has been selected because the inventors have observed that classes which share the same package and make use of similar classes (implied by the imports feature), and have a similar set of types defined as fields (i.e., instance variables) also share some common behavior. Therefore, it is preferred that they reside in the same category.

For C++ resources, the following features are extracted: class name, parent name, member functions, member fields names, and include statements.

The following groups of features relating to C++ resources have been identified:

comments—text;
iname—class name, parent name;
names—class name, parent name, member functions, member fields; and
types—includes, field types.

The motivation behind the group selection for C++ is identical to Java and therefore is not described in the interest of brevity.

Categorization Phase

During the categorization phase 55 a set or rules is applied to the four groups created in the feature extraction phase 53. We have constructed sets of rules for both Java and C++, which are disclosed in Listing 1 and Listing 2 respectively.

The syntax of the basic rule is as follows:

<condition>→<category>@<weight-factor>, where the symbol "→" stands for "categorize to" and the rule semantic is "categorize the resource into the category if the condition on the left side evaluates to true and set a weight factor for this categorization". The basic format of <condition> is as follows:

<group feature>|<keyword><occurrence-condition>, where the symbol "|" stands for "contains the keyword" and the semantics of the condition "the keyword appears in the group feature according to the occurrence-condition. The symbol "→" stands for "categorize to".

For example the first rule states that if the feature group "comments" (i.e. the one including the textual information for Java categorization) includes the keyword "sqlexception", and the expression is such that the keyword has to appear more then once, then it is associated with the "Database" category with a factor weight of "1". The weight in each rule stands for how strong this rule should be evaluated in the categorization decision. This allows one to obtain a confidence score for each category to which a resource was classified. In addition, it is possible to write more complex conditions by concatenating two simple conditions on the left side of the "—" with the "&" sign.

In a prototype of the preferred embodiment of the invention, the rules were constructed in two phases. In the first phase, a learning tool was employed. This produced a set of rules based on a set of training resources that were categorized manually by a domain expert. During the second phase a domain expert verified and extended these rules in order to improve both the precision and the total number of the resources being categorized. Each rule defines a condition and a category to which a resource would be classified if the condition of that rule is satisfied. A resource satisfying more than one rule can be classified in more than one category. For example, the following rule "names | host >1→ Network" will cause any resource having the name "host" occurring more than one time in the "names" group to be classified to the "Network" category.

Presentation Phase

Figure 4:
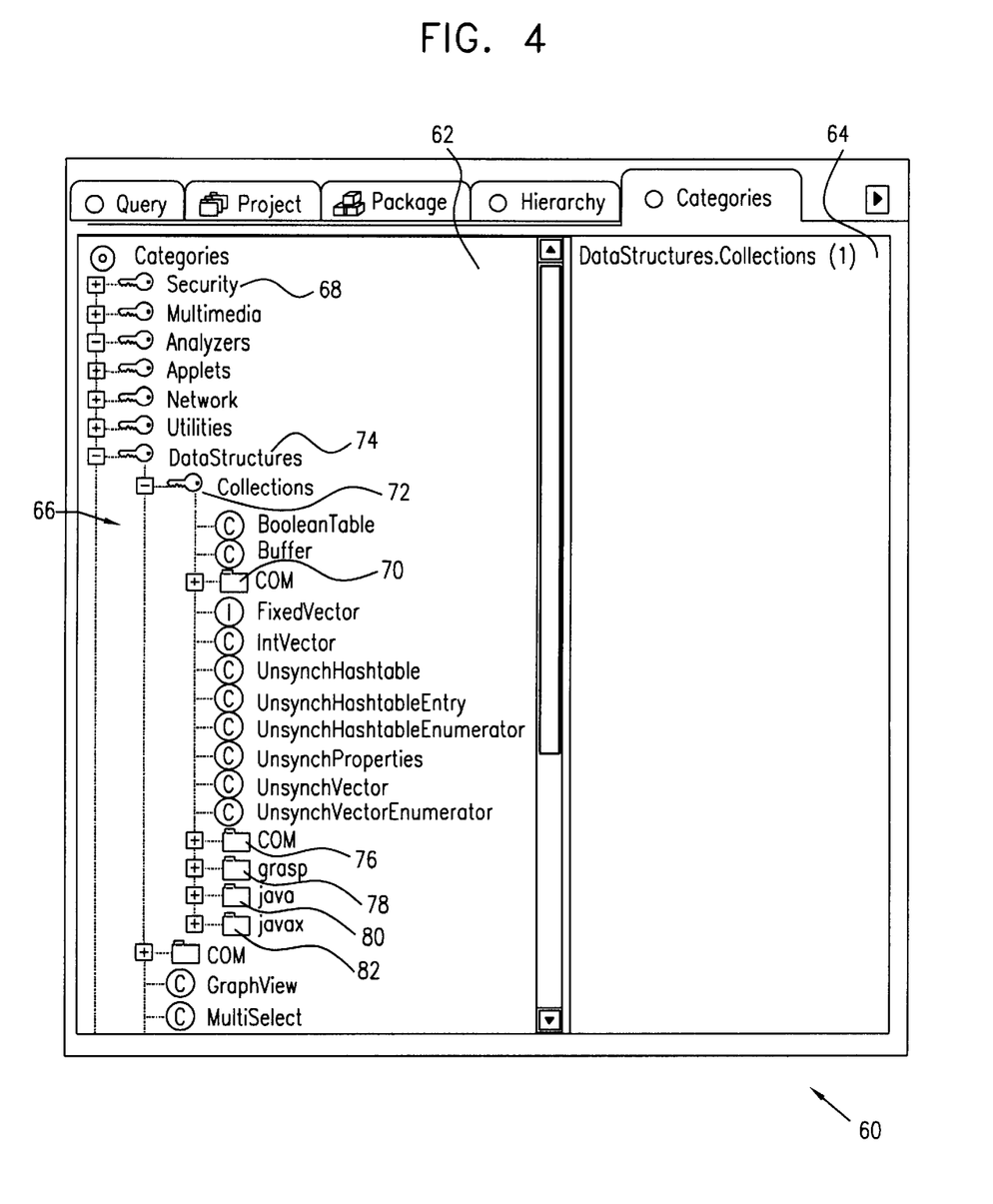
FIGS. 4 and 5 represent computer displays of the presentation phase in accordance with some aspects of the invention.
Figure 5:
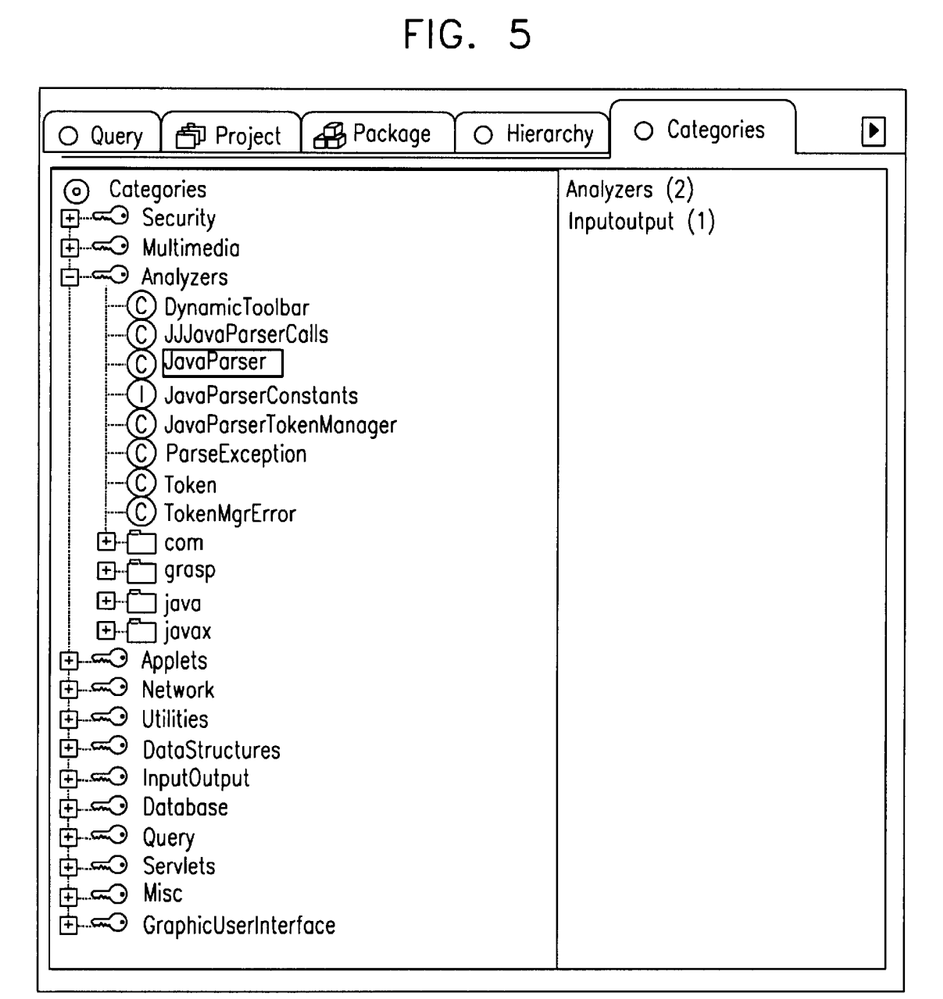

Referring now to FIGS. 3, 4 and 5, for use in the presentation phase 59, the user is shown a screen 60 on a computer monitor. A category visualization tool is presented as two main window panes, a left pane 62, and a right pane 64. The left pane 62 presents the taxonomy tree, i.e., the categories, and the code resources that belong to each category. The right pane 64 presents all the categories in which a selected resource of the left pane 62 is classified. In most cases, categories are presented as a tree view 66. In its most simple usage, this approach is not scalable, since once a node (e.g. a category) includes several thousand resources the user cannot efficiently browse it. There are several alternative solutions for this problem, such as sorting the resources in each category. According to some preferred embodiments of the invention, a view is presented which makes use of the language semantics. More specifically a tree view is implemented that is composed of two integrated hierarchies, unlike the conventional tree view presentation, where only one hierarchy is presented within a tree view. The technique according to this preferred embodiment of the invention applies to many types of tree based hierarchies. In the presently preferred implementation, the hierarchies are integrated in the following manner: the category tree is used as the top level hierarchy while the class package information forms the second hierarchy. The second hierarchy can start at any of the nodes of the top level hierarchy, but only in cases where at least one resource belongs to that hierarchy. The user who is presented with the tree view 66 navigates along the category tree until he reaches the desired subject or category. At this point, he may begin to navigate further according to the second hierarchy, an example of which is the package tree model shown in screen 60. The user is not required to browse a long flat list of resources.

In order to emphasize the two different hierarchies, each having different semantics, in the screen 60 the nodes representing a category node have been decorated with a "Key" icon 68, while the nodes representing nodes from the package hierarchy are decorated with a "Folder" icon 70. IN THE CASE OF C++, one can use the name spaces for building the second hierarchy level.

For example, in FIG. 4, one can observe that the node 72 named "Collections" is a sub-category of the "DataStructures" category 74 and together they compose part of the top level hierarchy. While the nodes "com" 76, "grasp" 78, "java" 80, "javax" 82, that are under the Collection node 72 are part of the second hierarchy, i.e. the package hierarchy.

The categories in the tree view are organized in a hierarchical manner so that the top level nodes represent the major categories, while the children of these nodes stand for subcategories. By selecting a category node the user is presented with a list of all subcategories, if there are any, and a list of all code resources that belong to the selected category. When a code resource is selected in the left pane 62, the list of all categories in which it was classified is displayed in the right pane 64. The categories in the right pane 64 are sorted according to their categorization rank, or category relevancy score, which was calculated during the categorization process. FIG. 5 shows a second example of the category visualization tool.

In a prototype version, using the techniques disclosed herein, successful categorizations were obtained 80% of the time on average. That is, 80% of the resources subjected to classification were placed into the correct category.

Category navigation according to preferred embodiments of the invention is a powerful method to explore code resources in a repository. It enables the user to find quickly what exists in the repository, and to find code resources, which are relevant to a concept of interest. This feature saves search time and improves the search results. Since the code resources are "grouped" into categories, one can perform "more like this" queries to find other code resources in the same category. In some preferred embodiments of the invention this functionality is supported by invoking the query on the index representing the entire repository and filtering out only those resources that belong to the desired category. The query capability is preferably extended by allowing users to formulate and execute queries for code resources that belong to or relate to a certain category.

The fact that the classification is done automatically provides a scaleable solution. Although the classification definition is done manually, it requires expert human input only during the preliminary phase 51 during which, the expert's knowledge is encapsulated into the rules used by the categorization engine. Therefore, the expert's presence is required only once.

Using conventional manual categorization, each update of the repository requires either the user's or an expert's knowledge in order to classify the code resource into the correct categories. In some preferred embodiments of the invention, classification of new or updated resources is done automatically. No additional input is required from the users and no experts are needed to maintain the repository. This fact makes this solution economically attractive and scaleable allowing to host hundreds of thousands of resources on a single server.

Rule Listings

---

Listing 1
Java rules

---

```
comments|sqlexception > 1 --> Database @ 1
comments|sql > 1 --> Database @ 1
names|sql > 0 --> Database @ 1
names|driver > 0 & types|sql > 0 --> Database @ 1
comments|jdbc > 0 --> Database @ 1
names|query > 0 & types|sql > 0 --> Database @ 1
comments|query > 1 & types|sql > 0 --> Database @ 1
names|query > 0 & types|jdbc > 0 --> Database @ 1
comments|query > 1 & types|jdbc > 0 --> Database @ 1
names|query > 0 & comments|database > 0 --> Database @ 1
comments|query > 1 & types|database > 0 --> Database @ 1
comments|query > 0 & comments|database > 0 --> Database @ 1
names|database > 0 --> Database @ 1
names|query > 1 & types|http > 1 --> Query.http @ 1
names|query > 1 & names|http > 1 --> Query.http @ 1
names|query > 1 & comments|http > 1 --> Query.http @ 1
types|query > 1 & types|http > 1 --> Query.http @ 1
types|query > 1 & names|http > 1 --> Query.http @ 1
types|query > 1 & comments|http > 1 --> Query.http @ 1
comments|query > 0 & types|http > 0 --> Query.http @ 1
comments|query > 1 & names|http > 0 --> Query.http @ 1
comments|query > 0 & comments|http > 0 --> Query.http @ 1
names|query > 0 & names|post > 0 --> Query.http @ 1
names|http > 0 & names|header > 0 --> Query.http @ 1
names|query > 0 & types|sqlx > 0 --> Query.sqlx @ 1
names|query > 1 & names|sqlx > 0 --> Query.sqlx @ 1
names|query > 0 & comments|sqlx > 0 --> Query.sqlx @ 1
types|query > 0 & types|sqlx > 0 --> Query.sqlx @ 1
types|query > 1 & names|sqlx > 0 --> Query.sqlx @ 1
types|query > 0 & comments|sqlx > 0 --> Query.sqlx @ 1
names|query > 0 & types|xml > 1 --> Query.xml @ 1
names|query > 1 & names|xml > 1 --> Query.xml @ 1
names|query > 0 & comments|xml > 1 --> Query.xml @ 1
types|query > 0 & types|xml > 1 --> Query.xml @ 1
types|query > 1 & names|xml > 1 --> Query.xml @ 1
types|query > 0 & comments|xml > 1 --> Query.xml @ 1
comments|query > 0 & types|xml > 1 --> Query.xml @ 1
comments|query > 1 & names|xml > 1 --> Query.xml @ 1
comments|query > 0 & comments|xml > 1 --> Query.xml @ 1
comments|io > 2 --> InputOutput @ 1
comments|reader > 2 --> InputOutput @ 1
comments|writer > 2 --> InputOutput @ 1
comments|pipe > 5 --> InputOutput @ 0.75
names|pipe > 5 --> InputOutput @ 0.75
names|stream > 0 --> InputOutput @ 1
names|flush > 0 --> InputOutput @ 0.944444
names|read > 1 --> InputOutput @ 0.857143
types|stream > 0 & types|input > 0 --> InputOutput @ 1
types|stream > 0 & types|output > 0 --> InputOutput @ 1
types|writer > 2 --> InputOutput @ 1
types|reader > 2 --> InputOutput @ 1
types|file > 1 --> InputOutput @ 1
types|file > 0 --> InputOutput @ 1
types|buffer > 1 --> InputOutput @ 1
comments|stream > 2 --> InputOutput @ 1
names|handler > 0 & comments|server > 1 --> Network @ 0.583333
names|host > 1 --> Network @ 1
names|socket > 0 --> Network @ 0.928571
comments|protocolexception > 0 --> Network @ 1
comments|network > 1 --> Network @ 1
comments|address > 1 & types|net > 0 --> Network @ 1
comments|socket > 0 --> Network @ 0.8
comments|url > 1 --> Network @ 0.8
```

-continued

Listing 1
Java rules

```
comments|connection > 2 --> Network @ 0.8
names|connection > 0 --> Network @ 0.8
names|connector > 0 --> Network @ 0.8
comments|protocol > 1 --> Network @ 0.8
names|proxy > 0 --> Network @ 1
comments|proxy > 0 --> Network @ 1
types|socket > 0 --> Network @ 1
types|url > 3 --> Network @ 1
types|server > 0 --> Network @ 1
names|server > 0 & types|net > 0 --> Network @ 1
comments|response > 0 & comments|request > 0 --> Network @ 1
comments|client > 0 & comments|server > 0 --> Network @ 0.5
names|response > 0 & names|request > 0 --> Network @ 1
comments|rmi > 1 --> Network.RemoteMethodInvocation @ 1
comments|stub > 1 --> Network.RemoteMethodInvocation @ 1
types|rmi > 0 --> Network.RemoteMethodInvocation @ 1
types|registry > 0 --> Network.RemoteMethodInvocation @ 1
types|sceleton > 0 --> Network.RemoteMethodInvocation @ 1
names|server > 0 & types|rmi > 0 --> Network.RemoteMethod-
Invocation @ 1
inames|stub > 0 --> Network.RemoteMethodInvocation @ 1
inames|skel > 0 --> Network.RemoteMethodInvocation @ 1
comments|marshal > 0 --> Network.RemoteMethodInvocation @ 1
comments|unmarshal > 0 --> Network.RemoteMethodInvocation @ 1
names|marshal > 0 --> Network.RemoteMethodInvocation @ 1
names|unmarshal > 0 --> Network.RemoteMethodInvocation @ 1
types|corba > 0 --> Network.Corba @ 1
types|orb > 0 --> Network.Corba @ 1
types|iiop > 0 --> Network.Corba @ 1
names|corba > 0 --> Network.Corba @ 1
types|server > 0 & types|http > 0 --> Network.http @ 1
types|server > 0 & names|http > 0 --> Network.http @ 1
names|server > 0 & names|http > 0 --> Network.http @ 1
names|token > 1 --> Analyzers @ 1
comments|analyze > 0 & comments|text > 0 --> Analyzers @ 1
names|parser > 0 --> Analyzers @ 1
types|parse > 0 --> Analyzers @ 1
names|analyze > 0 --> Analyzers @ 1
types|analyze > 0 --> Analyzers @ 1
comments|parser > 0 --> Analyzers @ 1
names|interpreter > 0 --> Analyzers @ 1
comments|interpreter > 1 --> Analyzers @ 1
names|view > 1 --> GraphicUserInterface @ 1
comments|awt > 1 & comments|component >= 1 --> GraphicUser-
Interface @ 1
comments|swing > 0 & comments|component >= 1 --> GraphicUser-
Interface @ 1
comments|box > 1 --> GraphicUserInterface @ 0.833333
names|dialog > 0 --> GraphicUserInterface @ 0.833333
names|panel > 0 --> GraphicUserInterface @ 1
names|Component > 0 --> GraphicUserInterface @ 1
names|ui > 0 --> GraphicUserInterface @ 1
names|gui > 0 --> GraphicUserInterface @ 1
names|guide > 0 --> GraphicUserInterface @ 1
types|gui > 0 --> GraphicUserInterface @ 1
names|page > 0 & types|gui > 0 --> GraphicUserInterface @ 1
names|button > 0 --> GraphicUserInterface @ 1
comments|button > 0 --> GraphicUserInterface @ 1
names|bound > 1 & types|awt > 0 --> GraphicUserInterface @ 1
names|bound > 1 & types|swing > 0 --> GraphicUserInterface @ 1
names|window > 1 --> GraphicUserInterface @ 1
names|component > 0 & types|awt > 0 --> GraphicUserInterface @ 1
names|component > 0 & types|swing > 0 --> GraphicUserInterface @ 1
types|color > 0 --> GraphicUserInterface @ 1
types|awt > 2 --> GraphicUserInterface @ 1
types|swing > 0 --> GraphicUserInterface @ 1
types|cursor > 0 --> GraphicUserInterface @ 1
types|dimension > 0 --> GraphicUserInterface @ 1
types|font > 0 --> GraphicUserInterface @ 1
types|toolkit > 0 --> GraphicUserInterface @ 1
types|checkbox > 0 --> GraphicUserInterface @ 1
types|choice > 0 --> GraphicUserInterface @ 1
types|list > 0 & types|awt > 0 --> GraphicUserInterface @ 1
types|list > 0 & types|swing > 0 --> GraphicUserInterface @ 1
types|button > 0 --> GraphicUserInterface @ 1
types|container > 0 --> GraphicUserInterface @ 1
```

-continued

Listing 1
Java rules

```
types|label > 0 --> GraphicUserInterface @ 1
types|scrollbar > 0 --> GraphicUserInterface @ 1
types|awt > 0 & types|layout > 0 --> GraphicUserInterface @ 1
names|checkbox > 0 --> GraphicUserInterface @ 1
types|model > 0 & types|swing > 0 --> GraphicUserInterface.Model @ 1
types|model > 0 & types|gui > 0 --> GraphicUserInterface.Model @ 1
types|model > 0 & types|ui > 0 --> GraphicUserInterface.Model @ 1
types|model > 0 & types|awt > 0 --> GraphicUserInterface.Model @ 1
comments|model > 1 & comments|list > 0 & types|swing > 0 -->
GraphicUserInterface.Model @ 1
comments|model > 1 & comments|tree > 0 & types|swing > 0 -->
GraphicUserInterface.Model @ 1
comments|model > 1 & comments|list > 0 & types|awt > 0 -->
GraphicUserInterface.Model @ 1
types|tree > 0 & types|swing > 0 --> GraphicUserInterface.Tree-
View @ 1
names|tree > 1 & types|swing > 0 --> GraphicUserInterface.Tree-
View @ 1
comments|tree > 2 & types|swing > 0 --> GraphicUserInterface.Tree-
View @ 1
comments|listener > 2 & comments|component >= 1 --> GraphicUser-
Interface.Listeners @ 1
comments|listener > 2 & types|awt > 0 --> GraphicUserInterface.
Listeners @ 1
comments|listener > 2 & types|swing > 0 --> GraphicUserInterface @ 1
inames|listener > 0 & types|awt > 0 --> GraphicUserInterface.
Listeners @ 0.923077
inames|listener > 0 & types|swing > 0 --> GraphicUserInterface.
Listeners @ 0.923077
inames|handler > 0 & types|awt > 0 --> GraphicUserInterface.
Listeners @ 0.923077
inames|handler > 0 & types|swing > 0 --> GraphicUserInterface.
Listeners @ 0.923077
inames|event > 0 & names|edit > 0 --> GraphicUserInterface.
Events @ 1
inames|event > 0 & types|awt > 0 --> GraphicUserInterface.
Events @ 0.923077
inames|event > 0 & types|swing > 0 --> GraphicUserInterface.
Events @ 0.923077
inames|adapter > 0 & types|swing > 0 --> GraphicUserInterface.
Events @ 0.923077
inames|adapter > 0 & types|awt > 0 --> GraphicUserInterface.
Events @ 0.923077
names|menuitem > 0 --> GraphicUserInterface.Menu @ 1
names|menubar > 0 --> GraphicUserInterface.Menu @ 1
names|menu > 0 & names|item > 0 --> GraphicUserInterface.Menu @ 1
types|menu > 2 --> GraphicUserInterface.Menu @ 1
names|menu > 0 & types|awt > 0 --> GraphicUserInterface.Menu @ 1
names|menu > 0 & types|swing > 0 --> GraphicUserInterface.Menu @ 1
inames|servlet > 0 --> Servlets @ 1
comments|servlet > 1 --> Servlets @ 1
comments|httpservlet > 0 --> Servlets @ 1
types|media > 0 --> Multimedia @ 1
comments|sound > 1 --> Multimedia.Audio @ 0
comments|audio > 0 --> Multimedia.Audio @ 0
names|audio > 0 --> Multimedia.Audio @ 0
types|audio > 0 --> Multimedia.Audio @ 0
types|poligon > 0 --> Multimedia.Image @ 1
comments|collor > 1 --> Multimedia.Image @ 0
types|graphics > 2 --> Multimedia.Image @ 1
comments|video > 0 --> Multimedia.Video @ 0
names|video > 0 --> Multimedia.Video @ 0
names|provider > 2 --> Security @ 1
names|digest > 2 --> Security @ 1
names|key > 2 & types|security > 0 --> Security @ 0.75
comments|certificate > 1 --> Security @ 1
comments|security > 3 --> Security @ 1
types|certificate > 0 --> Security @ 1
types|key > 0 & types|private > 0 --> Security @ 1
types|key > 0 & types|public > 0 --> Security @ 1
types|security > 0 --> Security @ 1
types|signature > 0 --> Security @ 1
comments|authentication > 0 --> Security @ 1
comments|encode > 2 --> Security @ 1
inames|stack > 0 --> DataStructures.Collections @ 1
inames|queue > 0 --> DataStructures.Collections @ 1
```

-continued

Listing 1
Java rules

```
inames|dictionary > 0 --> DataStructures.Collections @ 1
inames|vector > 0 --> DataStructures.Collections @ 1
inames|hashtable > 0 --> DataStructures.Collections @ 1
inames|hash > 0 --> DataStructures.Collections @ 1
types|hashtable > 1 & types|vector > 0 --> DataStructures @ 1
types|hashtable > 0 & types|vector > 1 --> DataStructures @ 1
types|hashtable > 2 --> DataStructures @ 1
types|vector > 2 --> DataStructures @ 1
inames|applet > 0 --> Applets @ 1
```

Listing 2
C++ rules

```
names|event > 0 --> GUI @ 1
names|helper > 2 --> GUI @ 1
comments|ui > 0 --> GUI @ 0.985201
names|cs <= 2 & names|factory > 0 & comments|ui = 0 --> Parsers @ 1
names|final > 0 & comments|ui = 0 --> Parsers @ 1
names|parser > 0 & comments|ui = 0 --> Parsers @ 1
comments|configuration > 0 & comments|ui = 0 --> Parsers @ 0.96
names|token > 0 & comments|ui = 0 --> Parsers @ 0.972222
comments|showexpansion > 0 --> Parsers @ 1
comments|llnamespace > 0 --> Parsers @ 0.954545
names|parse > 0 --> Parsers @ 0.933333
names|configuration > 0 --> Parsers @ 0.925
names|drag > 2 & names|c = 0 --> Mfc_Database @ 1
comments|idispatch > 0 & names|c = 0 --> Mfc_Database @ 1
comments|name = 0 & names|c > 0 --> Mfc_Database @ 0.734177
comments|1992–1997 > 0 --> Mfc_Database @ 0.8
comments|afx > 0 --> Mfc_Database @ 0.816667
names|override > 0 & comments|queue = 0 --> Collections @ 0.833333
comments|ui <= 2 & comments|queue > 0 --> Collections @ 0. 928571
comments|os2local > 0 --> Collections @ 1
comments|infomessage > 0 --> Collections @ 1
names|dos > 0 --> Collections @ 1
names|store > 2 --> Collections @ 0.866667
comments|markernodebase > 0 --> Collections @ 1
types|store > 0 --> Collections @ 1
comments|ftptree > 0 & names|c <= 1 --> Process @ 1
comments|folder > 0 & names|c > 1 --> Process @ 1
comments|bpatch > 1 --> Process @ 1
comments|mfc > 0 --> Process @ 0.888889
comments|cs > 0 & names|query > 0 --> Database @ 1
comments|interfacequeries > 0 --> Database @ 1
names|walker > 0 --> Database @ 1
comments|allocation > 0 --> MemoryAllocation @ 0.857143
names|heap > 0 --> MemoryAllocation @ 1
comments|ccirc3proppage > 2 --> Mfc_Ui @ 1
comments|exitinstance > 0 --> Mfc_Ui @ 0.8
comments|onresetstate > 0 --> Mfc_Ui @ 1
```

While this invention has been explained with reference to the structure disclosed herein, it is not confined to the details set forth and this application is intended to cover any modifications and changes as may come within the scope of the following claims:

What is claimed is:

1. A computer-implemented method for locating program code assets stored on a storage device, comprising the steps of:

defining asset-specific categories for classification of asset-specific information, said categories relating to predefined features of an object-oriented programming language used in creating said program code assets;

identifying stored program code assets;

extracting said asset-specific information from said stored program code assets using semantic characteristics of said object-oriented programming language to define extracted information;

classifying said extracted information in said asset-specific categories according to a predefined set of rules to define classified textual and semantic information; and storing said classified textual and semantic information for retrieval, wherein extracting said asset-specific information comprises dividing composite names in the program code assets into single words.

2. The method according to claim 1, wherein dividing said composite names comprises searching the program code assets for capital letters inside strings, and dividing said strings such that an individual word begins with each of the capital letters.

3. A computer-implemented method for locating program code assets stored on a storage device, comprising the steps of:

defining asset-specific categories for classification of asset-specific information, said categories relating to predefined features of an object-oriented programming language used in creating said program code assets;

identifying stored program code assets;

extracting said asset-specific information from said stored program code assets using semantic characteristics of said object-oriented programming language to define extracted information;

classifying said extracted information in said asset-specific categories according to a predefined set of rules to define classified textual and semantic information; and storing said classified textual and semantic information for retrieval, wherein said features are arranged in a plurality of groups according to said semantics of said object-oriented programming language, and wherein said set of rules comprises a plurality of subsets, which are respectively applicable to said plurality of groups, and wherein said assets comprise a class, and wherein said groups comprise a name group, comprising names that describe behavior of said class.

4. The method according to claim 3, wherein said step of extracting is performed with a language specific parser.

5. The method according to claim 3, wherein said predefined set of rules comprises a plurality of predefined sets of rules, each of said predefined sets of rules being applied to a different language specific group.

6. The method according to claim 3, wherein said storage device comprises a plurality of storage devices linked in a communications network.

7. The method according to claim 3, further comprising automatically updating said steps of identifying, extracting, and classifying, when a new resource is stored in said storage device.

8. The method according to claim 3, wherein said step of extracting is performed with a language specific parser.

9. The method according to claim 8, further comprising a step of grouping information obtained in said step of extracting according to a plurality of language specific groups.

10. The method according to claim 9, wherein said predefined set of rules comprises a plurality of sets of rules, each of said sets of rules being applied to a different one of said language specific groups.

11. The method according to claim 3, wherein said storage device comprises a plurality of storage devices linked in a communications network.

12. The method according to claim 3, further comprising the steps of automatically updating said steps of identifying, extracting, and classifying, when a new resource is stored in said storage device.

13. The method according to claim 3, wherein said names comprise a parent name of said class.

14. The method according to claim 13, wherein said parent name defines an inheritance relation characteristic of said class.

15. The method according to claim 3, wherein said names comprise at least one of a method name of a method in said class and a member function name of a member function in said class.

16. The method according to claim 3, and comprising:
displaying said stored information in a tree view having a first hierarchy of said classified textual and semantic information and a second hierarchy of said classified textual and semantic information, wherein nodes that are represented in said tree view comprise nodes of said first hierarchy and nodes of said second hierarchy.

17. The method according to claim 16, wherein said step of displaying further comprises the steps of:
selecting a displayed element in a first display area to define a selected element; and
displaying all categories of said stored information in which said selected element is classified.

18. The method according to claim 17, wherein said selected element is classified according to a category relevancy score.

19. The method according to claim 16, wherein said first hierarchy comprises categories of a computer programming language that were identified in said step of classifying, and said second hierarchy comprises a hierarchy of instances of said categories.

20. The method according to claim 19, wherein said second hierarchy comprises a class package.

21. The method according to claim 19, wherein said second hierarchy comprises a name space.

22. The method according to claim 3, wherein a syntax of rules in said predefined set of rules is "<condition>→<category>@<weight-factor>".

23. A computer software product for locating program code assets stored on a storage device, the product comprising a computer-readable medium in which computer program instructions are stored, which instructions, when read by a computer, cause the computer to perform the steps of:
receiving a definition of asset-specific categories for classification of asset-specific information, said categories relating to predefined features of an object-oriented programming language used in creating said program code assets;
identifying stored program code assets;
extracting said asset-specific information from said stored program code assets using semantic characteristics of said object-oriented programming language to define extracted information;
classifying said extracted information in said asset-specific categories according to a predefined set of rules to define classified textual and semantic information; and
storing said classified textual and semantic information for retrieval,
wherein extracting said asset-specific information comprises dividing composite names in the program code assets into single words.

24. The product according to claim 23, wherein dividing said composite names comprises searching the program code assets for capital letters inside strings, and dividing said strings such that an individual word begins with each of the capital letters.

25. A computer software product for locating program code assets stored on a storage device, the product comprising a computer-readable medium in which computer program instructions are stored, which instructions, when read by a computer, cause the computer to perform the steps of:
receiving a definition of asset-specific categories for classification of asset-specific information, said categories relating to predefined features of an object-oriented programming language used in creating said program code assets;
identifying stored program code assets;
extracting said asset-specific information from said stored program code assets using semantic characteristics of said object-oriented programming language to define extracted information;
classifying said extracted information in said asset-specific categories according to a predefined set of rules to define classified textual and semantic information; and
storing said classified textual and semantic information for retrieval,
wherein said features are arranged in a plurality of groups according to said semantics of said object-oriented programming language, and wherein said set of rules comprises a plurality of subsets, which are respectively applicable to said plurality of groups, and
wherein said assets comprise a class, and wherein said groups comprise a name group, comprising names that describe behavior of said class.

26. The computer software product according to claim 25, further comprising the steps of automatically updating said steps of identifying, extracting, and classifying, when a new resource is stored.

27. The computer software product according to claim 25, wherein said storage device comprises a plurality of storage devices linked in a communications network.

28. The computer software product according to claim 25, wherein said step of extracting is performed with a language specific parser.

29. The computer software product according to claim 28, further comprising a step of grouping information obtained in said step of extracting according to a plurality of language specific groups.

30. The computer software product according to claim 29, wherein said predefined set of rules comprises a plurality of sets of rules, each of said sets of rules being applied to a different one of said language specific groups.

31. The product according to claim 25, wherein said names comprise a parent name of said class.

32. The product according to claim 31, wherein said parent name defines an inheritance relation characteristic of said class.

33. The product according to claim 25, wherein said names comprise at least one of a product name of a product in said class and a member function name of a member function in said class.

34. The product according to claim 25, wherein said instructions further cause the computer to perform the step of:
displaying said stored information in a tree view having a first hierarchy of said classified textual and semantic information and a second hierarchy of said classified textual and semantic information, wherein nodes that are represented in said tree view comprise nodes of said first hierarchy and nodes of said second hierarchy.

35. The computer software product according to claim 34, wherein said step of displaying further comprises the steps of:
   selecting a displayed element in said first display area; and
   in a second display area of said monitor displaying all categories of said stored information in which a selected element is classified.

36. The computer software product according to claim 35, wherein said selected element is classified according to a category relevancy score.

37. The computer software product according to claim 34, wherein said first hierarchy comprises categories of a computer programming language that were identified in said step of classifying, and said second hierarchy comprises a hierarchy of instances of said categories.

38. The computer software product according to claim 37, wherein said second hierarchy comprises a class package.

39. The computer software product according to claim 37, wherein said second hierarchy comprises a name space.

40. The product according to claim 25, wherein a syntax of rules in said predefined set of rules is "<condition>→<category>@<weight-factor>".

41. A computer system, comprising:
   a storage device for storage of program code assets therein;
   a memory for storage of program instructions; and
   an execution unit that accesses said program instructions in said memory for execution thereof, wherein said program instructions cause said execution unit to perform the steps of:
      defining asset-specific categories for classification of asset-specific information, said categories relating to predefined features of an object-oriented programming language used in creating said program code assets;
      identifying stored program code assets;
      extracting said asset-specific information from said stored program code assets using semantic characteristics of said object-oriented programming language to define extracted information;
      classifying said extracted information in said asset-specific categories according to a predefined set of rules to define classified textual and semantic information; and
      storing said classified textual and semantic information for retrieval,
   wherein extracting said asset-specific information comprises dividing composite names in the program code assets into single words.

42. The system according to claim 41, wherein dividing said composite names comprises searching the program code assets for capital letters inside strings, and dividing said strings such that an individual word begins with each of the capital letters.

43. A computer system, comprising:
   a storage device for storage of program code assets therein;
   a memory for storage of program instructions; and
   an execution unit that accesses said program instructions in said memory for execution thereof, wherein said program instructions cause said execution unit to perform the steps of:
      defining asset-specific categories for classification of asset-specific information, said categories relating to predefined features of an object-oriented programming language used in creating said program code assets;
      identifying stored program code assets;
      extracting said asset-specific information from said stored program code assets using semantic characteristics of said object-oriented programming language to define extracted information;
      classifying said extracted information in said asset-specific categories according to a predefined set of rules to define classified textual and semantic information; and
      storing said classified textual and semantic information for retrieval,
   wherein said features are arranged in a plurality of groups according to said semantics of said object-oriented programming language, and wherein said set of rules comprises a plurality of subsets, which are respectively applicable to said plurality of groups, and
   wherein said assets comprise a class, and wherein said groups comprise a name group, comprising names that describe behavior of said class.

44. The computer system according to claim 43, wherein said program instructions further cause the computer to automatically update said steps of identifying, extracting, and classifying when a new resource is stored in said storage device.

45. The computer system according to claim 43, wherein said storage device comprises a plurality of storage devices linked in a communications network.

46. The computer system according to claim 43, wherein said step of extracting is performed with a language specific parser.

47. The computer system according to claim 46, wherein said program instructions further cause the execution unit to group information obtained in said step of extracting according to a plurality of language specific groups.

48. The computer system according to claim 47, wherein said predefined set of rules comprises a plurality of sets of rules, each of said sets of rules being applied to a different one of said language specific groups.

49. The system according to claim 43, wherein said names comprise a parent name of said class.

50. The system according to claim 49, wherein said parent name defines an inheritance relation characteristic of said class.

51. The system according to claim 43, wherein said names comprise at least one of a system name of a system in said class and a member function name of a member function in said class.

52. The system according to claim 43, wherein the system further comprises a display monitor, and wherein said program instructions further cause said execution unit to perform the step of:
   displaying said stored information on said display monitor in a tree view having a first hierarchy of said classified textual and semantic information and a second hierarchy of said classified textual and semantic information, wherein nodes that are represented in said tree view comprise nodes of said first hierarchy and nodes of said second hierarchy.

53. The computer system according to claim 52, wherein said step of displaying further comprises the steps of:

selecting a displayed element in said first display area; and in a second display area of said display monitor displaying all categories of said stored information in which a selected element is classified.

54. The computer system according to claim 53, wherein said selected element is classified according to a category relevancy score.

55. The computer system according to claim 52, wherein said first hierarchy comprises categories of a computer programming language that were identified in said step of classifying, and said second hierarchy comprises a hierarchy of instances of said categories.

56. The computer system according to claim 55, wherein said second hierarchy comprises a class package.

57. The computer system according to claim 55, wherein said second hierarchy comprises a name space.

58. The system according to claim 43, wherein a syntax of rules in said predefined set of rules is "<condition>→<category>@<weight-factor>".

* * * * *